(12) United States Patent
Arai et al.

(10) Patent No.: US 9,897,869 B2
(45) Date of Patent: Feb. 20, 2018

(54) LIQUID CRYSTAL DISPLAY DEVICE

(71) Applicant: ORTUS TECHNOLOGY CO., LTD., Hino (JP)

(72) Inventors: Norihiro Arai, Hino (JP); Kunpei Kobayashi, Hino (JP); Ryota Mizusako, Hino (JP)

(73) Assignee: ORTUS TECHNOLOGY CO., LTD., Hino (JP)

( * ) Notice: Subject to any disclaimer, the term of this patent is extended or adjusted under 35 U.S.C. 154(b) by 0 days.

(21) Appl. No.: 15/200,872

(22) Filed: Jul. 1, 2016

(65) Prior Publication Data

US 2016/0313616 A1 Oct. 27, 2016

Related U.S. Application Data

(63) Continuation of application No. PCT/JP2014/082157, filed on Dec. 4, 2014.

(30) Foreign Application Priority Data

Jan. 10, 2014 (JP) .................................. 2014-003710

(51) Int. Cl.
*G02F 1/1335* (2006.01)
*G02F 1/1343* (2006.01)
(Continued)

(52) U.S. Cl.
CPC ...... *G02F 1/134309* (2013.01); *G02F 1/1368* (2013.01); *G02F 1/13306* (2013.01);
(Continued)

(58) Field of Classification Search
CPC .......................................... G02F 2001/134381
(Continued)

(56) References Cited

U.S. PATENT DOCUMENTS

| 2003/0160920 | A1* | 8/2003 | Ha ................... G02F 1/133555 349/113 |
| 2013/0010235 | A1* | 1/2013 | Hirosawa .......... G02F 1/134309 349/96 |
| 2013/0057815 | A1 | 3/2013 | Takano et al. |
| 2013/0107167 | A1 | 5/2013 | Suzuki |

FOREIGN PATENT DOCUMENTS

| CN | 102654694 A1 | 9/2012 |
| JP | 2009-145385 | 7/2009 |

(Continued)

OTHER PUBLICATIONS

International Search Report dated Feb. 17, 2015 in corresponding International Application No. PCT/JP2014/082157.
(Continued)

*Primary Examiner* — Phu Vu

(57) ABSTRACT

A liquid crystal display device includes: first and second substrates disposed to be opposed to each other; a liquid crystal layer held between the first and second substrates, formed of a p-type liquid crystal material, and configured to take a vertical alignment in a state in which no electric field is applied; one or a plurality of linear pixel electrodes provided on the first substrate; a first common electrode provided on the first substrate, and formed in a manner to surround or sandwich the pixel electrode with a predetermined spacing; and a second common electrode provided on the second substrate, having substantially the same planar shape as the first common electrode, and formed such that at least a part of the second common electrode overlaps the first common electrode in planar projection.

5 Claims, 17 Drawing Sheets

(51) Int. Cl.
  *G02F 1/133* (2006.01)
  *G02F 1/1362* (2006.01)
  *G02F 1/1368* (2006.01)
  *G02F 1/1337* (2006.01)
  *G02F 1/137* (2006.01)

(52) U.S. Cl.
  CPC .. *G02F 1/133528* (2013.01); *G02F 1/134363* (2013.01); *G02F 1/136213* (2013.01); *G02F 1/136286* (2013.01); *G02F 1/133553* (2013.01); *G02F 2001/13706* (2013.01); *G02F 2001/133541* (2013.01); *G02F 2001/133742* (2013.01); *G02F 2001/134318* (2013.01); *G02F 2001/134372* (2013.01); *G02F 2001/134381* (2013.01); *G02F 2201/121* (2013.01); *G02F 2201/123* (2013.01)

(58) Field of Classification Search
  USPC ......................................................... 349/114
  See application file for complete search history.

(56) References Cited

FOREIGN PATENT DOCUMENTS

| | | |
|---|---|---|
| JP | 2010-217853 | 9/2010 |
| JP | 2013-29784 | 2/2013 |
| JP | 2013-54124 | 3/2013 |
| JP | 2013-182203 | 9/2013 |
| WO | WO2012/086666 A1 | 6/2012 |

OTHER PUBLICATIONS

International Preliminary Report on Patentability dated Jul. 21, 2016 in corresponding International Patent Application No. PCT/JP2014/082157.
Extended European Search Report dated Apr. 26, 2017 in corresponding European Patent Application No. 14877758.4.
First Office Action dated Nov. 21, 2017 in corresponding Japanese Patent Application No. 2014-091847.

\* cited by examiner

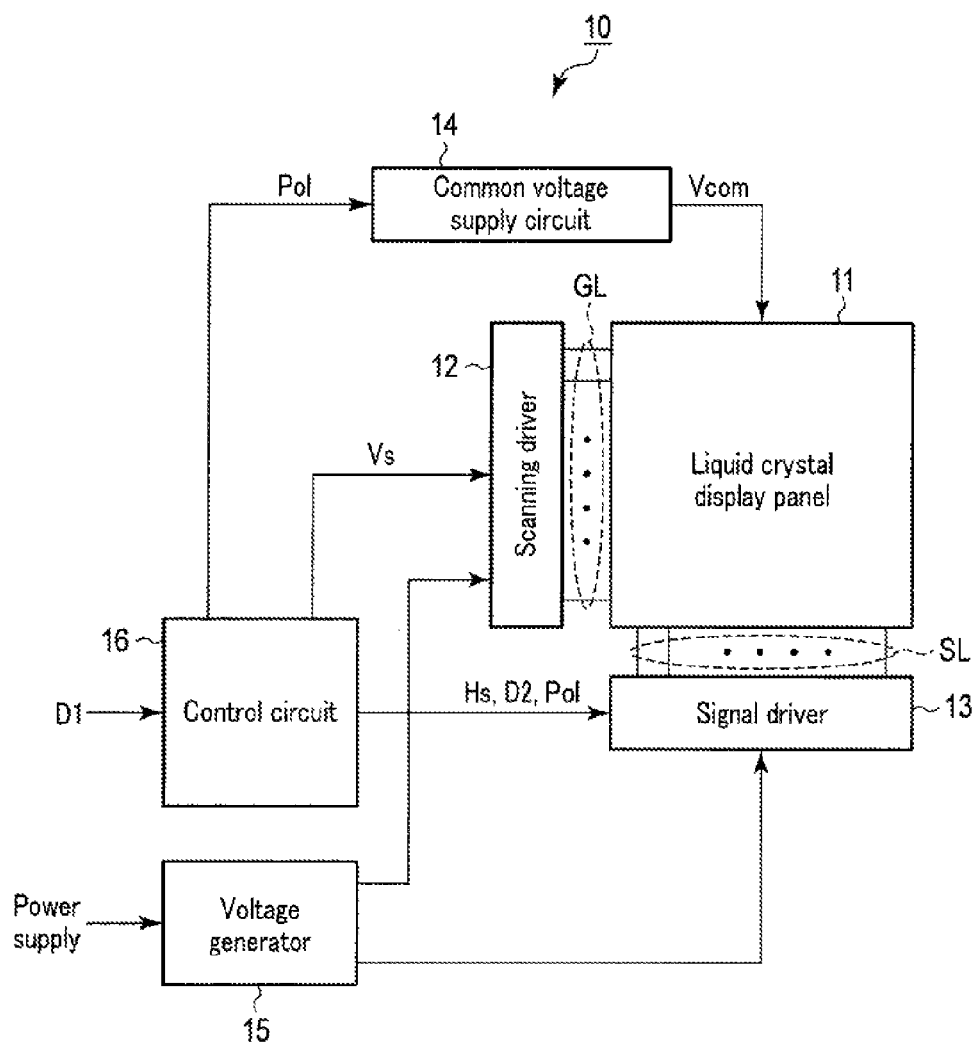
F I G. 1

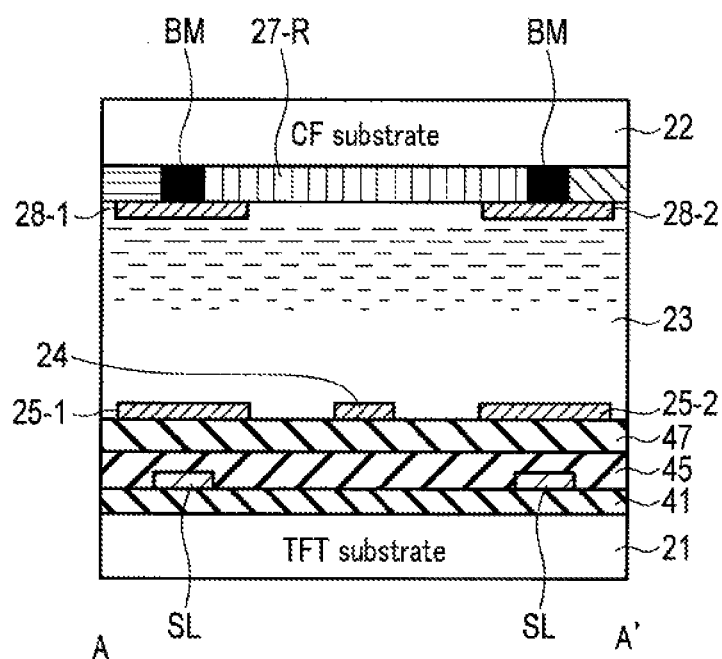
F I G. 6

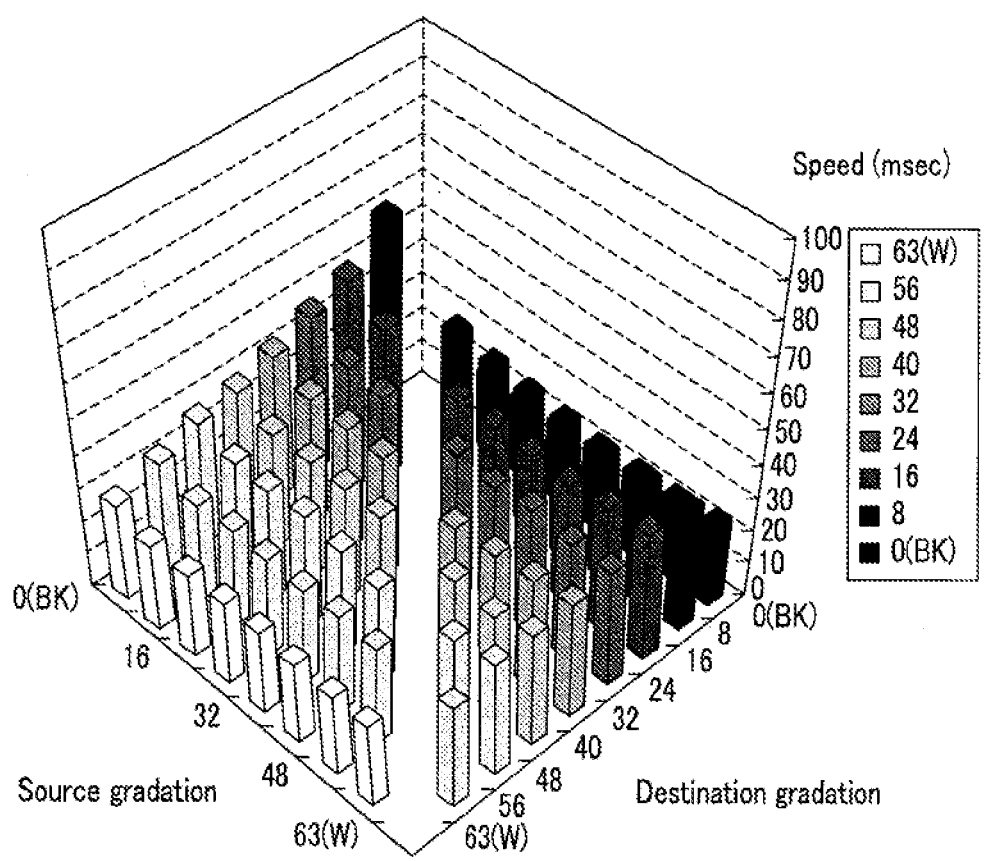
F I G. 12

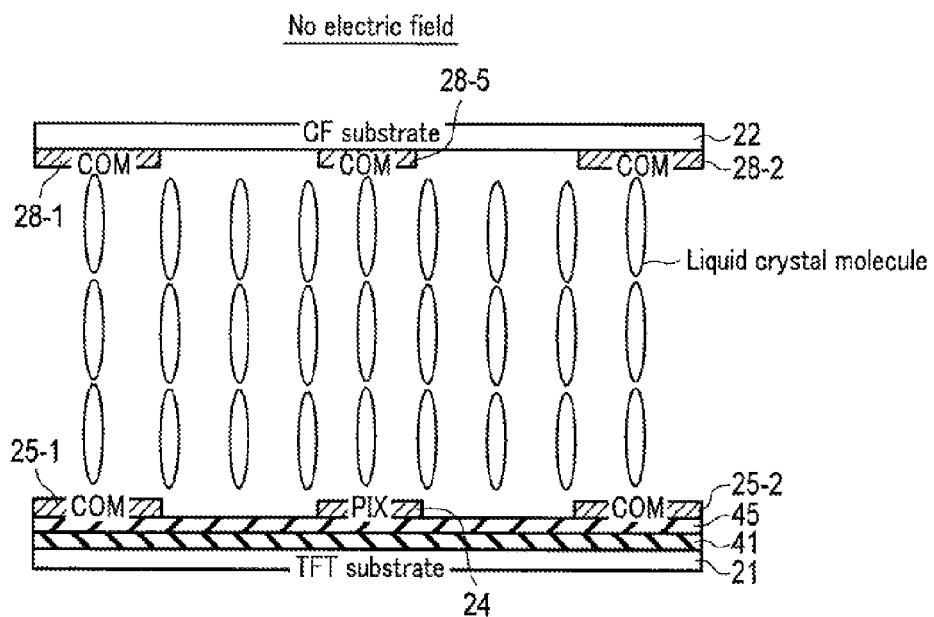
F I G. 14A
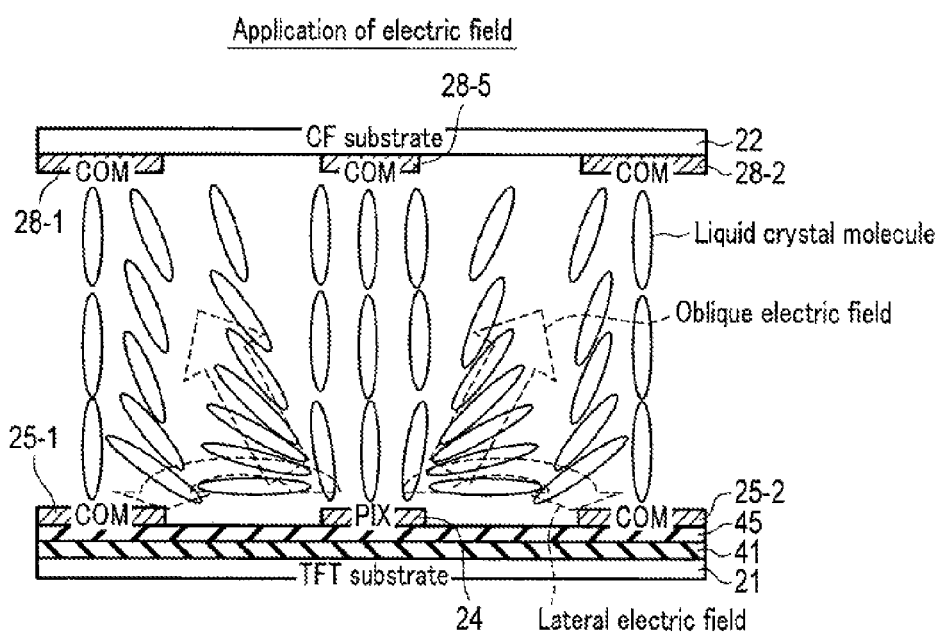
F I G. 14B

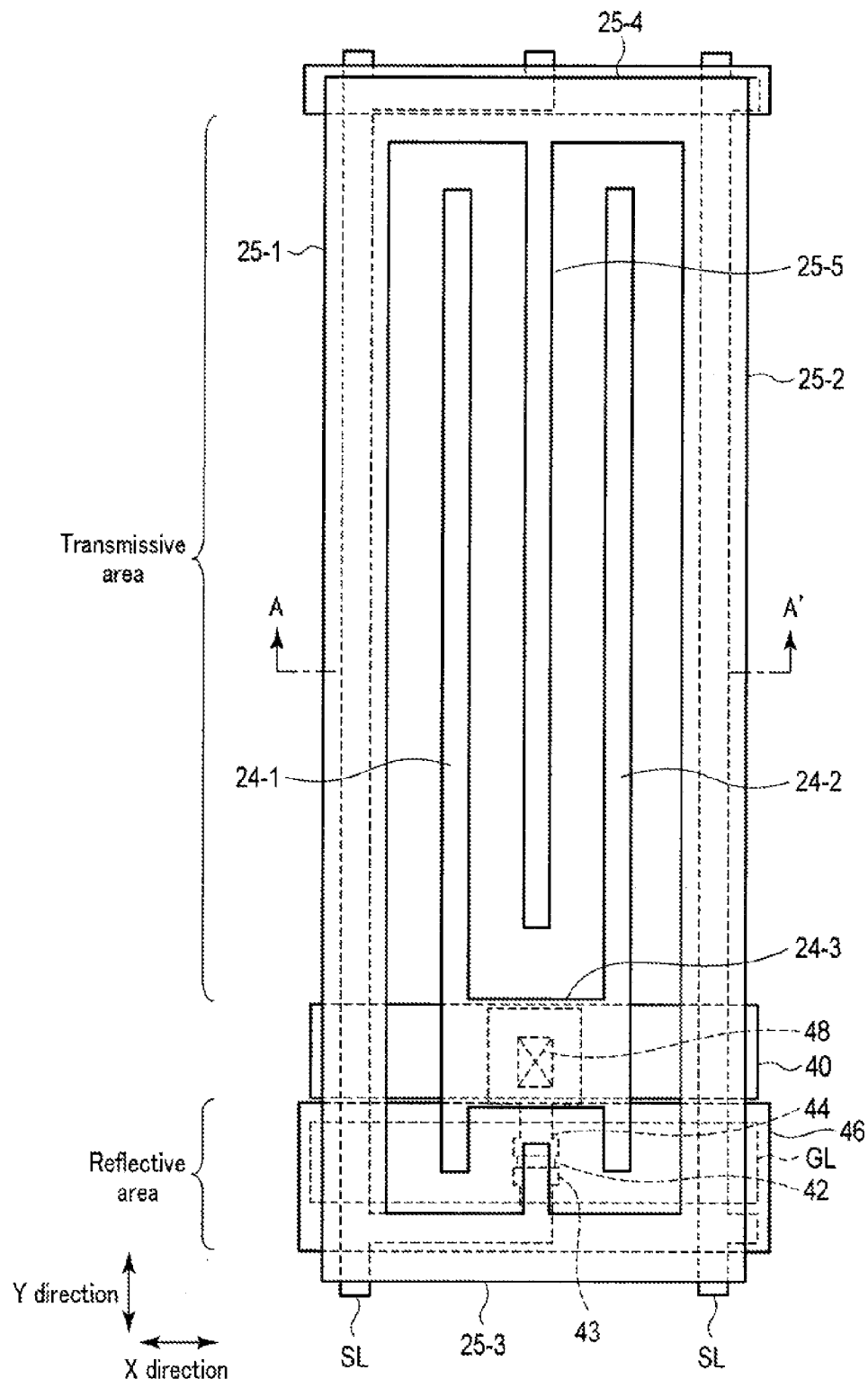
F I G. 15

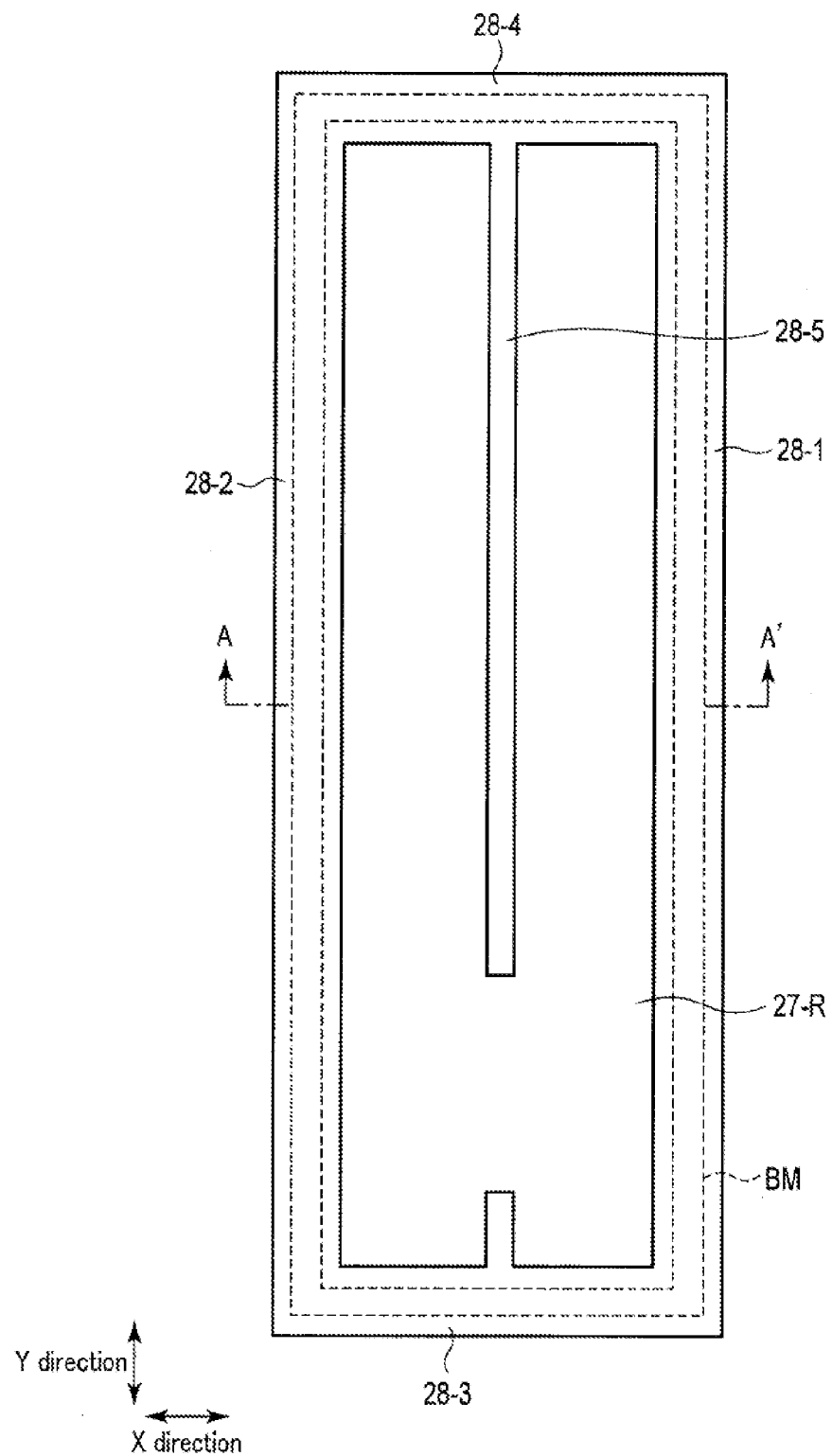
F I G. 16

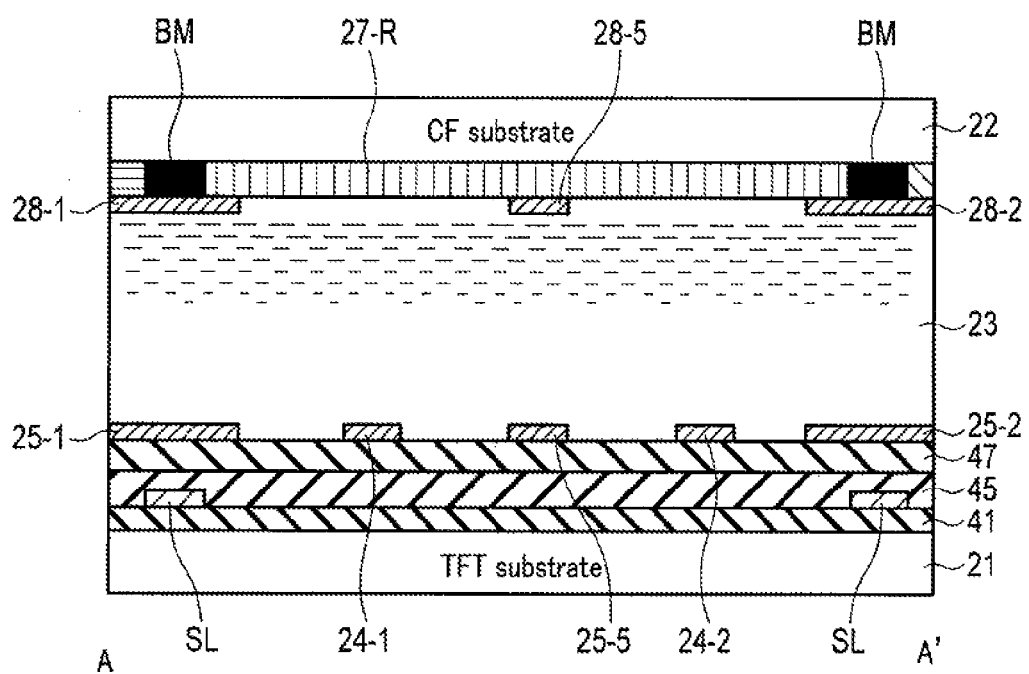
F I G. 17

US 9,897,869 B2

LIQUID CRYSTAL DISPLAY DEVICE

CROSS-REFERENCE TO RELATED APPLICATIONS

This application is a Continuation Application of PCT Application No. PCT/JP2014/082157, filed Dec. 4, 2014, and based upon and claiming the benefit of priority from Japanese Patent Application No. 2014-003710, filed Jan. 10, 2014, the entire contents of all of which are incorporated herein by reference.

BACKGROUND OF THE INVENTION

1. Field of the Invention

The present invention relates to a liquid crystal display device.

2. Description of the Related Art

In a liquid crystal display panel, a TN (Twisted Nematic) mode, a VA (Vertical Alignment) mode, and an IPS (In-Plane Switching)/FFS (Fringe Field Switching) mode are used. To meet a demand for a wide viewing angle and a high contrast, the VA mode and IPS/FFS mode are dominantly used. However, the responsivity in the VA mode and IPS/FFS mode is not sufficient, and there is a problem with moving image display. In addition, an OCB (Optically Compensated Bend) mode and a TBA (Transverse Bend Alignment) mode, which can improve responsivity and adapt to moving image display, have been proposed.

In the OCB mode, although high-speed responsivity is exhibited, a transition operation from a splay alignment, which is an initial alignment, to a bend alignment at a time of driving (e.g. application of a voltage of 10 V or more), is needed at a time of power-on, and a driving circuit for an initial transition is necessary, in addition to a normal driving circuit. Thus, the OCB mode leads to an increase in cost, and there is such a problem that the OCB mode is not suited to mobile devices in which there are restrictions to power supplies.

Furthermore, in the TBA mode, since a dielectric film is provided on a common electrode on a color filter substrate side, there is a problem that image persistence tends to easily occur due to a DC imbalance resulting from this dielectric film. Besides, since an oblique electric field is weak at a normal driving voltage (e.g. about 5 V), there is a problem that transmittance lowers.

BRIEF SUMMARY OF THE INVENTION

According to an aspect of the present invention, there is provided a liquid crystal display device comprising:
first and second substrates disposed to be opposed to each other;
a liquid crystal layer held between the first and second substrates, formed of a p-type liquid crystal material, and configured to take a vertical alignment in a state in which no electric field is applied;
one or a plurality of linear pixel electrodes provided on the first substrate;
a first common electrode provided on the first substrate, and formed in a manner to surround or sandwich the pixel electrode with a predetermined spacing; and
a second common electrode provided on the second substrate, having substantially the same planar shape as the first common electrode, and formed such that at least a part of the second common electrode overlaps the first common electrode in planar projection.

BRIEF DESCRIPTION OF THE SEVERAL VIEWS OF THE DRAWINGS

FIG. 1 is a block diagram of a liquid crystal display device according to a first embodiment of the present invention;
FIG. 6 is a cross-sectional view of the liquid crystal display panel, taken along line A-A' shown in FIG. 4;
FIG. 12 is a graph for explaining a response speed in a second comparative example;
FIG. 14A is a view for explaining an alignment state of the liquid crystal layer;
FIG. 14B is a view for explaining an alignment state of the liquid crystal layer;
FIG. 15 is a layout view of a TFT substrate according to a third embodiment of the present invention;
FIG. 16 is a layout view of a CF substrate as viewed from the liquid crystal layer side;
and
FIG. 17 is a cross-sectional view of the liquid crystal display panel, taken along line C-C' shown in FIG. 15 and FIG. 16.

DETAILED DESCRIPTION OF THE INVENTION

Figure 2:
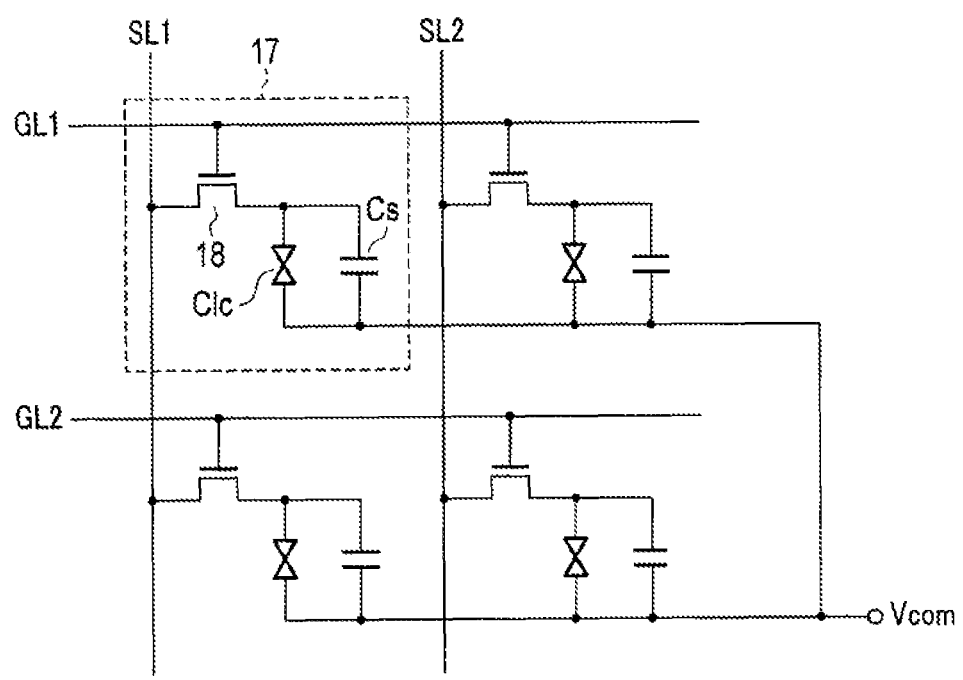
FIG. 2 is a circuit diagram of a pixel array included in a liquid crystal display panel illustrated in FIG. 1.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. Note that in the following explanation, the same reference numerals denote elements having the same functions and arrangements, and a repetitive explanation will be made only when necessary.

[First Embodiment]

[1. Circuit Configuration of Liquid Crystal Display Device]

First, an example of the circuit configuration of a liquid crystal display device 10 is described. FIG. 1 is a block diagram of the liquid crystal display device 10 according to a first embodiment of the present invention. In the present embodiment, the liquid crystal display device 10 of an active matrix type is described by way of example.

The liquid crystal display device 10 includes a liquid crystal display panel 11, a scanning driver (scanning line driving circuit) 12, a signal driver (signal line driving circuit) 13, a common voltage supply circuit 14, a voltage generator 15, and a control circuit 16.

In the liquid crystal display panel 11, there are provided a plurality of scanning lines GL which extend in a row direction (X direction), and a plurality of signal lines SL which extend in a column direction (Y direction). Pixels 17 are disposed at intersection areas between the plural scanning lines GL and signal lines SL. The pixels 17 are arranged in a matrix.

FIG. 2 is a circuit diagram of a pixel array included in the liquid crystal display panel 11 illustrated in FIG. 1. FIG. 2 illustrates, in an extracted manner, four pixels. The pixel 17 includes a switching element 18, a liquid crystal capacitance Clc, and a storage capacitance Cs. As the switching element 18, for example, a TFT (Thin Film Transistor) is used.

The source of the TFT 18 is electrically connected to the signal line SL. The gate of the TFT 18 is electrically connected to the scanning line GL. The drain of the TFT 18 is electrically connected to the liquid crystal capacitance Clc. The liquid crystal capacitance Clc is constituted by a pixel electrode, a common electrode, and a liquid crystal layer held between the pixel electrode and common electrode.

The storage capacitance Cs is connected in parallel with the liquid crystal capacitance Clc. The storage capacitance Cs has a function of suppressing a potential variation occurring in the pixel electrode, and retaining a driving voltage, which is applied to the pixel electrode, during a period until a driving voltage corresponding to a next signal is applied. The storage capacitance Cs is constituted by the pixel electrode, a storage electrode (storage capacitance line), and an insulation film held between the pixel electrode and the storage electrode. A common voltage Vcom is applied by the common voltage supply circuit 14 to the common electrode and storage electrode.

In FIG. 1, the scanning driver 12 is connected to the plural scanning lines GL, and receives a vertical control signal Vs from the control circuit 16. Based on the vertical control signal Vs, the scanning driver 12 applies to the scanning lines GL scanning signals for controlling the ON/OFF of the TFTs 18.

The signal driver 13 is connected to the plural signal lines SL, and receives a horizontal control signal Hs and display data D2 from the control circuit 16. Based on the horizontal control signal Hs, the signal driver 13 applies, to the signal lines SL, gradation signals (driving voltages) corresponding to the display data D2. The common voltage supply circuit 14 generates a common voltage Vcom, and supplies the common voltage Vcom to the liquid crystal display panel 11.

The control circuit 16 receives image data D1 from the outside. The control circuit 16 generates display data D2 from the image data D1. In addition, in order to execute AC driving (inversion driving), the control circuit 16 generates an inversion signal Pol in every predetermined period (e.g. 1 frame, 1 field, or 1 line). In addition, the control circuit 16 sends the vertical control signal Vs to the scanning driver 12, sends the horizontal control signal Hs, display data D2 and inversion signal Pol to the signal driver 13, and sends the inversion signal Pol to the common voltage supply circuit 14. In accordance with this, the signal driver 13 inverts the polarity of the driving voltage, each time the inversion signal Pol is input. Similarly, the common voltage supply circuit 14 inverts the polarity of the common voltage Vcom, each time the inversion signal Pol is input. Thereby, the AC driving of the liquid crystal display panel 11 can be realized.

The voltage generator 15 generates a gate voltage which is necessary for generating scanning signals, and supplies the gate voltage to the scanning driver 12. In addition, the voltage generator 15 generates a driving voltage which is necessary for driving pixels, and supplies the driving voltage to the signal driver 13. Besides, where necessary, the voltage generator 15 generates various voltages which are necessary for the operation of the liquid crystal display device 10, and supplies these voltages to the respective circuit components.

In the liquid crystal display device 10 with this configuration, if the TFT 18 included in an arbitrary pixel 17 is set in an ON state, the driving voltage is applied to the pixel electrode via the signal line SL, and the alignment state of the liquid crystal varies in accordance with a voltage difference between the driving voltage and the common voltage Vcom. Thereby, the transmission state of light, which is made incident on the liquid crystal display panel 11 from the light source, varies, and image display is realized.

[2. Configuration of Liquid Crystal Display Panel]

Figure 3:
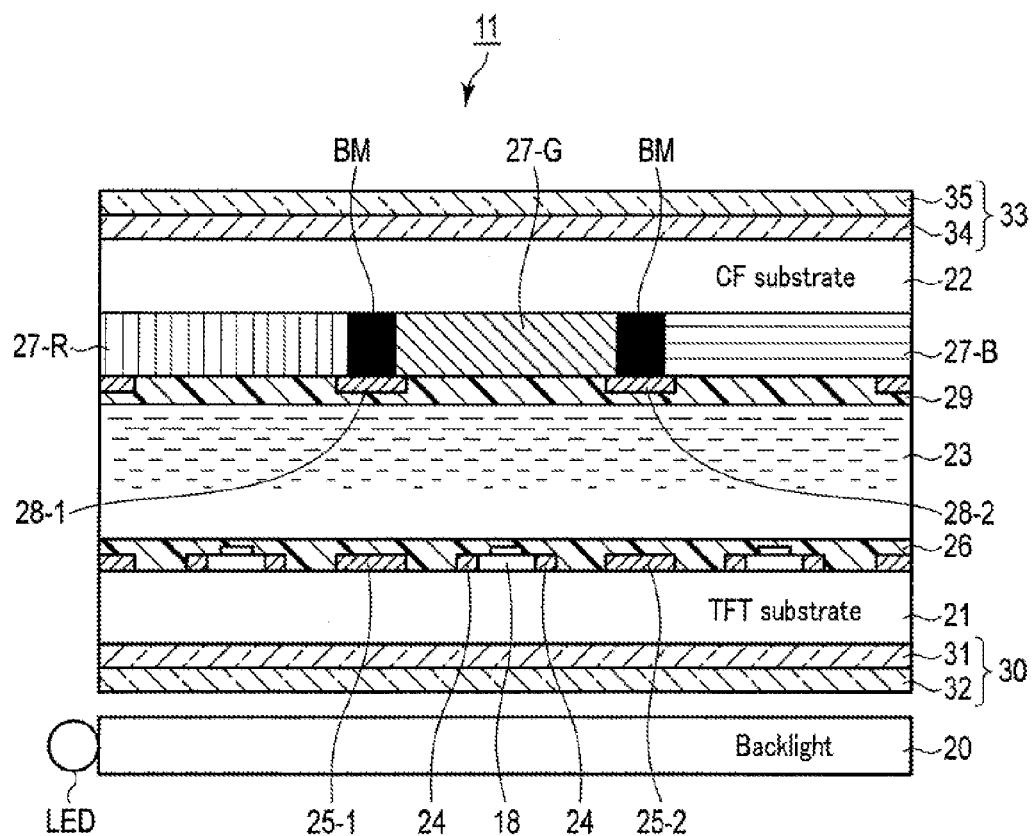
FIG. 3 is a schematic cross-sectional view of the liquid crystal display panel according to the first embodiment.

FIG. 3 is a schematic cross-sectional view of the liquid crystal display panel 11 according to the first embodiment of the present invention.

An area light source (backlight) 20 is disposed to be opposed to that surface of the liquid crystal display panel 11, which is opposite to a display surface thereof. As this backlight 20, a side-light-type (edge-light-type) backlight device, for instance, is used. Specifically, the backlight 20 is configured such that light from a plurality of light-emitting elements, which are composed of LEDs (light-emitting diodes) or the like, is incident on an end face of a light guide plate, and light is emitted from one plate surface of the light guide plate toward the pixel array. For example, the backlight 20 is composed such that a reflection sheet, a light guide plate, a diffusion sheet and a prism sheet are stacked.

The liquid crystal display panel 11 includes a TFT substrate 21 on which TFTs functioning as switching elements, and pixel electrodes are formed; a color filter substrate (CF substrate) 22 on which a color filter and a common electrode are formed and which is disposed to be opposed to the TFT substrate 21; and a liquid crystal layer 23 held between the TFT substrate 21 and CF substrate 22. Each of the TFT substrate 21 and CF substrate 22 is composed of a transparent substrate (e.g. glass substrate).

The liquid crystal layer 23 is composed of a liquid crystal material which is sealed by a sealing member (not shown) that adheres the TFT substrate 21 and CF substrate 22. In addition, the cell gap of the liquid crystal layer 23 is controlled by spacers (not shown) provided in the liquid crystal layer 23. The alignment of liquid crystal molecules of the liquid crystal material is controlled in accordance with an electric field, and thereby the optical characteristics of the liquid crystal material are varied. In the present embodiment, the liquid crystal layer 23 is composed of a positive type (p-type) liquid crystal material, and the liquid crystal material is aligned substantially vertical to the substrate surface (set in a vertical alignment) in a state (initial alignment state) in which no voltage (no electric field) is applied. Thus, in the liquid crystal layer 23 of the present embodiment, at a time of no voltage (no electric field), the major axes (directors) of the liquid crystal molecules are vertically aligned. At a time of voltage application (electric field application), the directors of the liquid crystal molecules are inclined in the direction of the electric field.

On the liquid crystal layer 23 side of the TFT substrate 21, the TFT 18 and pixel electrode 24 are provided for each pixel 17. In addition, a common electrode 25 (including common electrodes 25-1 and 25-2), which is formed in a manner to sandwich or surround the pixel electrode 24, is provided on the TFT substrate 21. Furthermore, an alignment film 26 is provided on the TFT substrate 21 in a manner to cover the pixel electrodes 24 and common electrodes 25-1 and 25-2.

On the liquid crystal layer 23 side of the CF substrate 22, a color filter 27 is provided. The color filter 27 includes a plurality of colored filters (colored members), and includes, concretely, a plurality of red filters 27-R, a plurality of green filters 27-G, and a plurality of blue filters 27-B. A general color filter is composed of red (R), green (G) and blue (B), which are the three primary colors of light. A set of neighboring three colors, R, G and B, is a unit of display (called "pixel" or "picture element"). A single-color portion of R, G or B in one pixel is a minimum driving unit called "sub-pixel (sub-picture element)". The TFT 18 and pixel electrode 24 are provided for each of the sub-pixels. In the description below, the sub-pixel is called "pixel", unless it is particularly necessary to distinguish the pixel and the sub-pixel.

A black matrix (light shielding film) BM for shielding light is provided at boundary portions of the pixels (sub-pixels). For example, the black matrix BM is formed in a mesh shape. The black matrix BM is provided, for example, in order to shield unnecessary light between colored members, and to enhance the contrast.

A common electrode 28 (including common electrodes 28-1 and 28-2), which is formed in a manner to overlap the common electrodes 25-1 and 25-2 in planar projection (in planar view), is provided on the color filter 27 and black matrix BM. Specifically, the common electrode 28 on the CF substrate 22 side is not formed in a planar shape, but is formed in a linear shape or a grid shape. An alignment film 29 is provided on the CF substrate 22 in a manner to cover the common electrodes 28-1 and 28-2.

Circular polarizers 30 and 33 are provided in a manner to sandwich the TFT substrate 21 and CF substrate 22. The circular polarizer 30 circularly polarizes incident light from the backlight 20. The circular polarizer 33 circularly polarizes incident light from the display surface, and linearly polarizes transmissive light passing through the liquid crystal layer 23. The circular polarizer 30 is composed of a retardation plate 31 and a polarizer 32. The circular polarizer 33 is composed of a retardation plate 34 and a polarizer 35.

The polarizer 32, 35 has a transmission axis and an absorption axis which are perpendicular to each other, in a plane perpendicular to a direction of travel of light. Of the light having planes of vibration in random directions, the polarizer 32, 35 transmits linearly polarized light (linearly polarized light component) having a plane of vibration parallel to the transmission axis, and absorbs linearly polarized light (linearly polarized light component) having a plane of vibration parallel to the absorption axis. The polarizers 32 and 35 are arranged such that their transmission axes are perpendicular to each other, that is, arranged in a crossed-Nicol state.

The retardation plate 31, 34 has a refractive index anisotropy, and has a slow axis and a fast axis, which are perpendicular to each other, in a plane perpendicular to the direction of travel of light. The retardation plate 31, 34 has a function of imparting a predetermined retardation (retardation of λ/4 when λ is wavelength of transmissive light) between lights of predetermined wavelengths passing through the slow axis and fast axis. Specifically, the retardation plate 31, 34 is composed of a λ/4 plate. The slow axis of the retardation plate 31 is set at an angle of 45° to the transmission axis of the polarizer 32. The slow axis of the retardation plate 34 is set at an angle of 45° to the transmission axis of the polarizer 35.

[3. Concrete Example of Liquid Crystal Display Panel 11]

Next, a more concrete configuration example of the liquid crystal display panel 11 is described. A transflective liquid crystal display panel 11 will be described below by way of example. The transflective liquid crystal display panel 11 includes, within one pixel, a reflective area which displays an image by reflecting outside light, and a transmissive area which displays an image by transmitting backlight.

Figure 4:
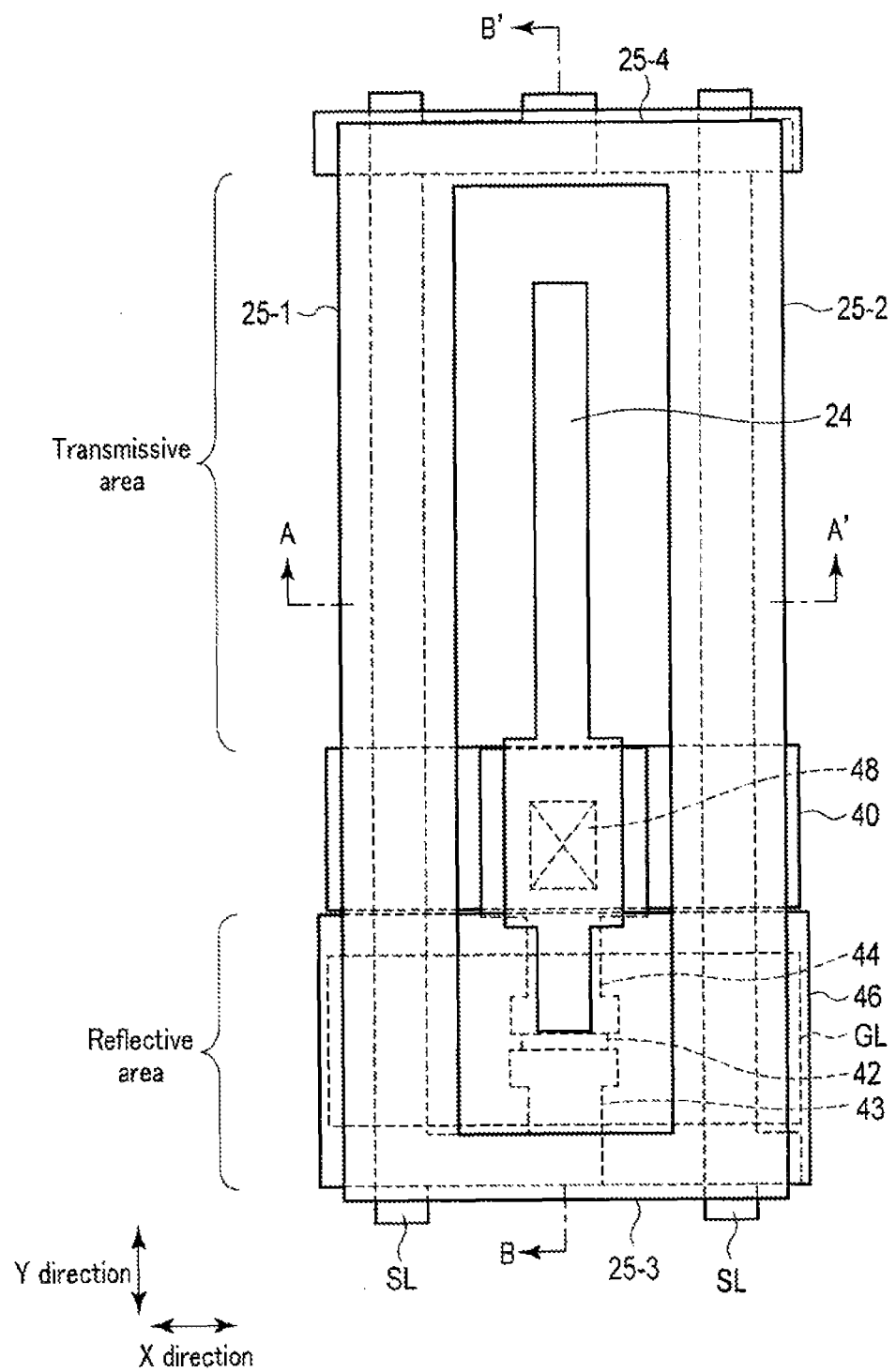
FIG. 4 is a layout view of the liquid crystal display panel.
Figure 5:
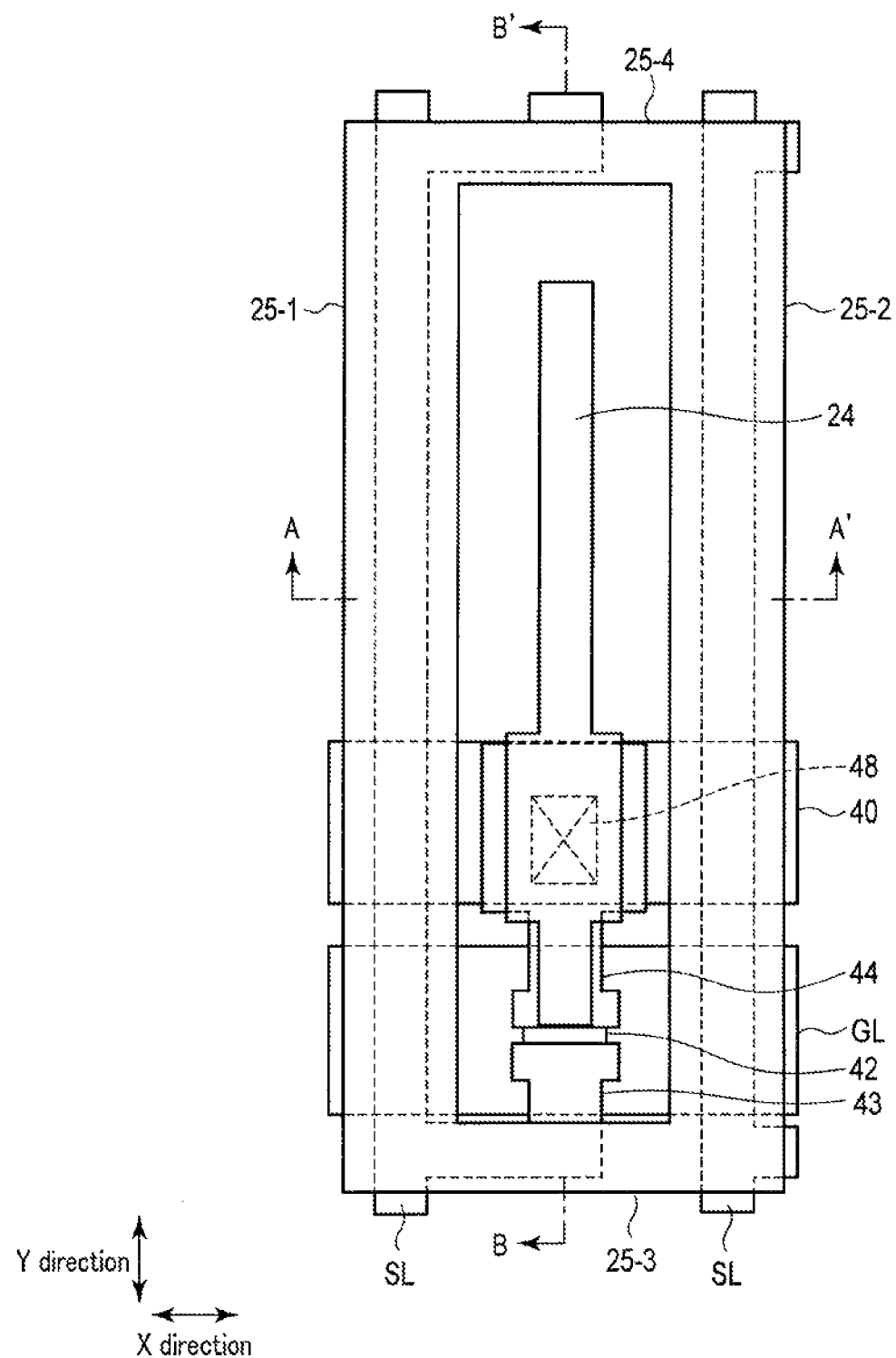
FIG. 5 is a layout view of the liquid crystal display panel from which a reflection film is removed.
Figure 7:
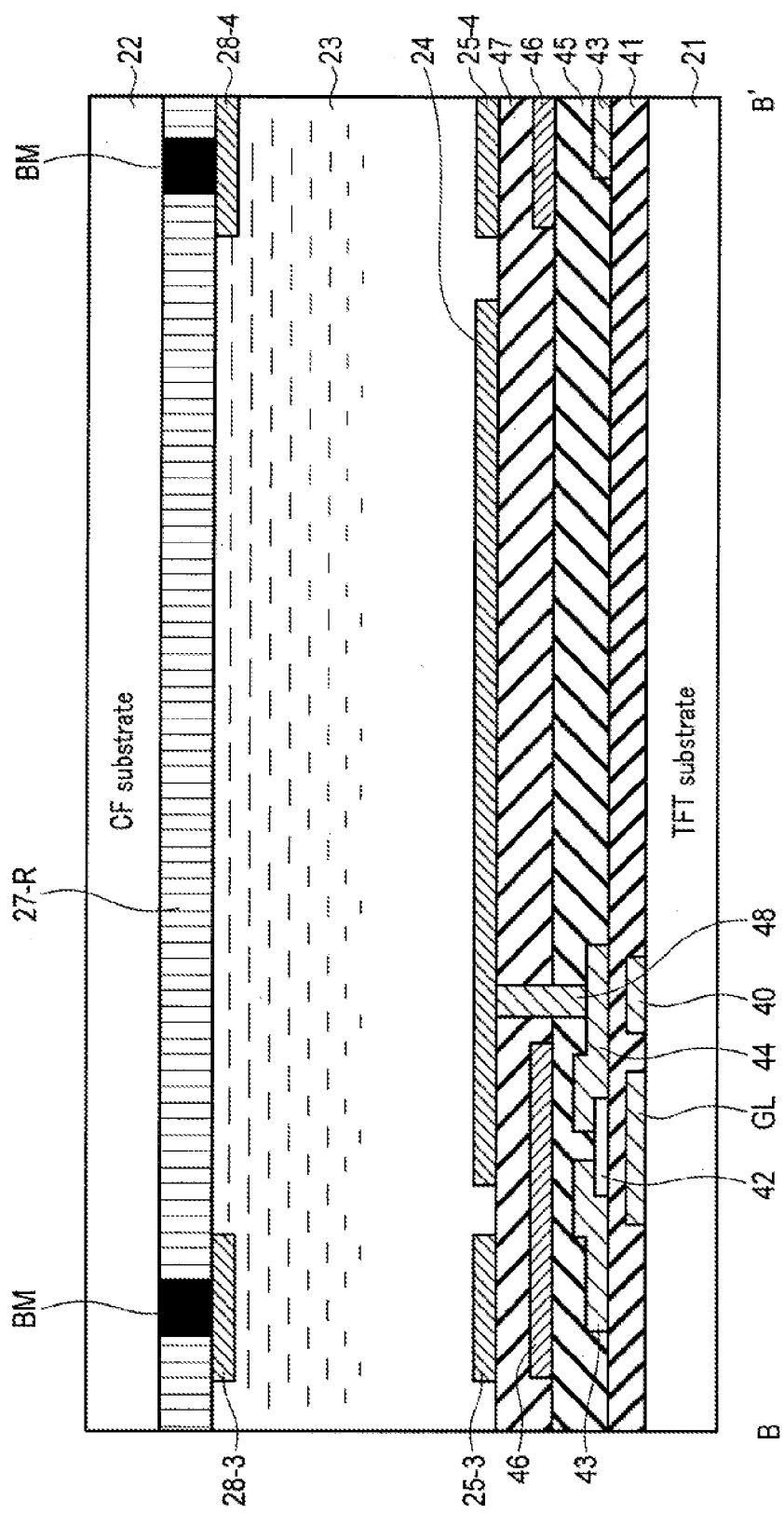
FIG. 7 is a cross-sectional view of the liquid crystal display panel, taken along line B-B' shown in FIG. 4.

FIG. 4 is a layout view of the liquid crystal display panel 11. The layout view of FIG. 4 mainly illustrates the configuration of the TFT substrate 21, and illustrates a layout of one pixel. FIG. 5 is a layout view of the liquid crystal display panel 11 from which a reflection film in FIG. 4 is removed. FIG. 6 is a cross-sectional view of the liquid crystal display panel 11, taken along line A-A' shown in FIG. 4. FIG. 7 is a cross-sectional view of the liquid crystal display panel 11, taken along line B-B' shown in FIG. 4. Incidentally, in the cross-sectional views of FIG. 6 and FIG. 7, the depiction of the circular polarizers 30 and 33 and alignment films 26 and 29 shown in FIG. 3 is omitted.

On the TFT substrate 21, a scanning line (gate electrode) GL extending in the X direction is provided. The scanning line GL functions as a gate electrode of the TFT 18. In addition, on the TFT substrate 21, a storage capacitance line 40 extending in the X direction is provided. The storage capacitance line 40 constitutes the storage capacitance Cs shown in FIG. 2 with the pixel electrode 24. On the TFT substrate 21, an insulation film 41 is provided in a manner to cover the gate electrode GL and storage capacitance line 40. The insulation film 41 on the gate electrode GL functions as a gate insulation film of the TFT 18.

A semiconductor layer 42 is provided above the gate electrode GL and on the insulation film 41. The semiconductor layer 42 is composed of, for example, amorphous silicon or polysilicon. A source electrode 43 and a drain electrode 44 are provided on both sides of the gate electrode GL and on the insulation film 41. Each of the source electrode 43 and drain electrode 44 is partly put in contact with the semiconductor layer 42. The TFT 18 is composed of the gate electrode GL, gate insulation film 41, source electrode 43 and drain electrode 44.

In addition, on the insulation film 41, signal lines SL extending in the Y direction are provided. The signal line SL is electrically connected to the source electrode 43. The signal lines SL are disposed below the black matrix BK.

An insulation film 45 is provided on the TFT 18 and signal line SL. A reflection film 46, which is formed in a manner to cover the TFT 18, is provided on the insulation film 45. The reflective area of the pixel 17 corresponds to the area where the reflection film 46 is formed. The transmissive area of the pixel 17 corresponds to the area excluding the area where the reflection film 46 and storage capacitance line 40 are formed. An insulation film 47 is provided on the reflection film 46.

The pixel electrode 24 and common electrode 25 are provided on the insulation film 47. The pixel electrode 24 is linearly formed in a manner to extend in the Y direction along a central part of the pixel 17, and is electrically connected to the drain electrode 44 by a contact plug 48. It is preferable that the width of the pixel electrode 24 is thinner. However, if restrictions due to a manufacturing method are taken into account, the width of the pixel electrode 24 is actually set to about 2 to 3 μm. In the configuration example of FIG. 4, the drain electrode 44 is composed of a first electrode portion which is partly in contact with the semiconductor layer 42, and a second electrode portion which extends from this first electrode portion to under the contact plug 48.

The common electrode 25 is formed in a manner to sandwich or surround the pixel electrode 24 with a predetermined spacing. In the configuration example of FIG. 4, the common electrode 25 is so formed as to surround the pixel electrode 24. Specifically, the common electrode 25 includes a basic unit composed of linear common electrodes 25-1 and 25-1 which are disposed in a manner to sandwich the pixel electrode 24 from both sides in the X direction with a predetermined spacing and which each extend in the Y direction, and linear common electrodes 25-3 and 25-4 which electrically connect the common electrodes 25-1 and 25-2 and which each extend in the X direction. The common electrode 25 is configured such that the basic units are disposed in a grid shape on four sides so as to correspond to the pixels. The distance between the pixel electrode 24 and common electrode 25 should preferably be 15 μm or less, and should more preferably be about 3 to 4 μm. In addition, the common electrodes 25-1 and 25-2 are formed in a manner to cover the signal lines SL in planar projection. Thereby, it is possible to prevent an unnecessary electric field due to the signal lines SL from being applied to the liquid crystal layer 23.

Figure 8A:
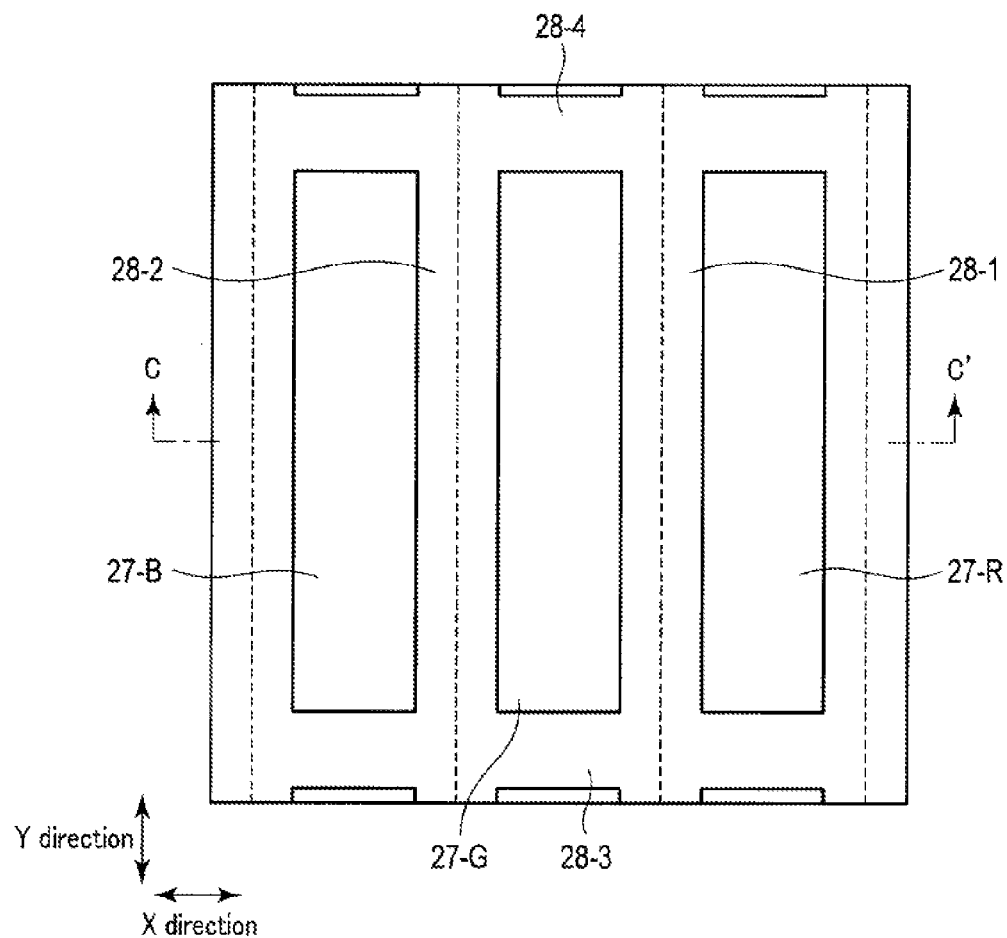
FIG. 8A is a layout view of a CF substrate as viewed from a liquid crystal layer side.
Figure 8B:
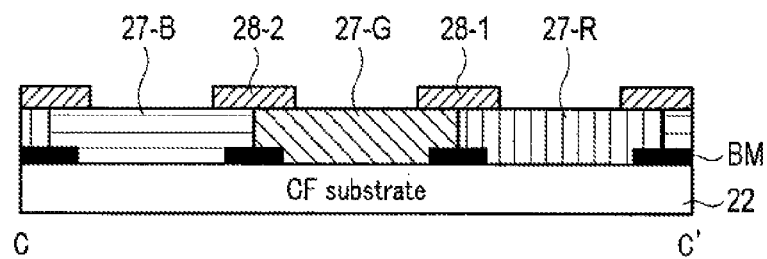
FIG. 8B is a cross-sectional view of the CF substrate, taken along line C-C' shown in FIG. 8A.

FIG. 8A and FIG. 8B are a layout view and a cross-sectional view of the CF substrate 22 as viewed from liquid crystal layer 23 side. FIG. 8A is a layout view of the CF substrate 22, and FIG. 8B is a cross-sectional view of the CF substrate 22, taken along line C-C' shown in FIG. 8A. FIG. 8A and FIG. 8B illustrate the layout of three pixels. FIG. 8A and FIG. 8B illustrate, by way of example, a color filter 27 of a stripe array.

A grid-shaped black matrix BM, which is disposed at boundaries of the pixels, is provided on the CF substrate 22. A color filter 27 (including a red filter 27-R, a green filter 27-G and a blue filter 27-B) is provided on the CF substrate 22 and black matrix BM.

A grid-shaped common electrode 28, which is disposed at boundaries of the pixels, is provided on the color filter 27. The common electrode 28 has substantially the same planar shape as the common electrode 25 formed on the TFT substrate 21 side, and is disposed in a manner to overlap the common electrode 25 in planar projection. Specifically, the common electrode 28 is configured to include a basic unit composed of linear common electrodes 28-1 and 28-2 which are disposed in a manner to sandwich the pixel electrode 24 from both sides in the X direction and which each extend in the Y direction, and linear common electrodes 28-3 and 28-4 which electrically connect the common electrodes 28-1 and 28-2 and which each extend in the X direction, and such basic units are disposed in a grid shape on four sides so as to correspond to the pixels.

In the present embodiment, the expression "common electrode 25 and common electrode 28 overlap" includes a case in which the common electrode 25 and common electrode 28 completely overlap in planar projection, and a case in which the common electrode 25 and common electrode 28 partially overlap in planar projection, that is, parts of the common electrode 25 and common electrode 28 overlap. The thickness of the common electrode 28 may be equal to, or may be different from, the thickness of the common electrode 25. When the liquid crystal display panel 11 is configured such that the thickness of the common electrode 25 and the thickness of the common electrode 28 are different, the common electrode 25 and common electrode 28 are formed such that their mutually opposed portions overlap at least partly. In addition, the expression "common electrode 25 and common electrode 28 overlap" can cover a case in which the common electrode 25 and common electrode 28 are formed with a displacement due to an error or misalignment resulting from the manufacturing method or manufacturing step, and at least their parts overlap.

The pixel electrode 24, contact plug 48 and common electrodes 25 and 28 are composed of transparent electrodes, and ITO (indium tin oxide), for instance, is used. The insulation films 41, 45 and 47 are composed of a transparent insulative material, and silicon nitride (SiN), for instance, is used. As the reflection film 46, for example, aluminum (Al), silver (Ag), or an alloy including either of them is used. As the source electrode 43, drain electrode 44, scanning line GL, signal line SL and storage capacitance line 40, for example, any one of aluminum (Al), molybdenum (Mo), chromium (Cr) and tungsten (W), or an alloy including at least one or more kinds of them is used.

Incidentally, in the above description, the configuration example of the transflective liquid crystal display panel 11 including the reflective area and transmissive area has been described. However, the present embodiment is applicable to a transmissive liquid crystal display panel 11 which does not include the reflective area.

The transmissive liquid crystal display panel 11 is constructed by removing the reflection film 46 from the configuration of the transflective liquid crystal display panel 11. Specifically, a layout view of the transmissive liquid crystal display panel 11 is the same as the layout view of FIG. 5. Furthermore, a cross-sectional view of the transmissive liquid crystal display panel 11 is the same as the cross-sectional view of FIG. 7 from which the reflection film 46 is omitted.

[4. Operation]

Figure 9A:
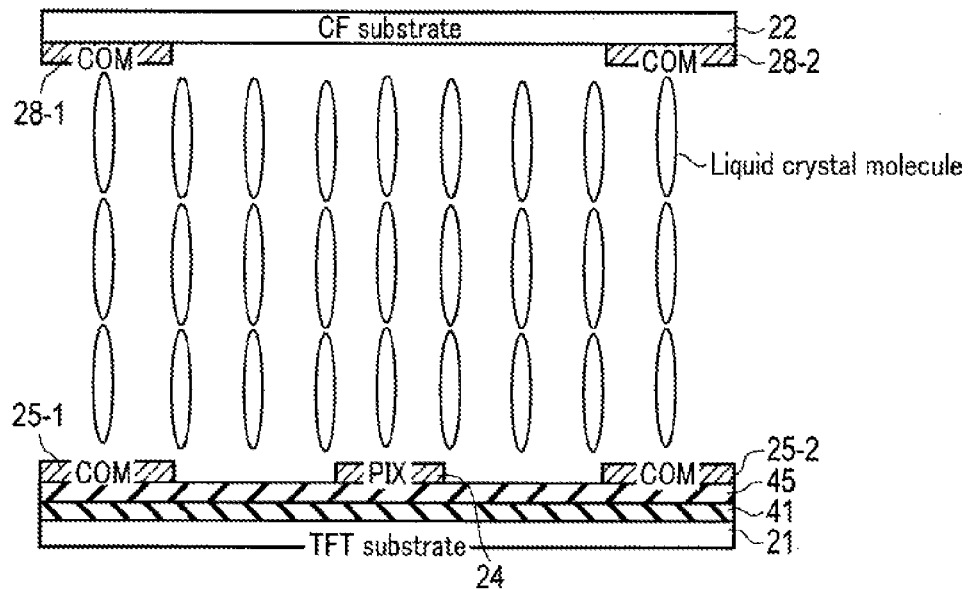
FIG. 9A is a view for explaining an alignment state of the liquid crystal layer.

Next, the operation of the liquid crystal display device 10 with the above-described configuration is described. First, a description is given of display in a state in which no electric field is applied to the liquid crystal layer 23. FIG. 9A is a view for explaining an alignment state of liquid crystal molecules in the state in which no electric field is applied to the liquid crystal layer 23.

The common voltage supply circuit 14 applies a common voltage Vcom (e.g. 0 V) to the common electrodes 25 and 28, and the signal driver 13 applies a common voltage Vcom to the pixel electrode 24. In the case of the transflective liquid crystal display panel 11, the common voltage supply circuit 14 also applies the common voltage Vcom to the reflection film 46. Thereby, it is possible to prevent an electric field due to the wiring and electrode below the reflection film 46 from being applied to the liquid crystal layer 23.

In the voltage relation of FIG. 9A, there occurs a state (OFF state) in which no electric field is applied to the liquid crystal layer 23, and the liquid crystal molecules keep the initial alignment. Specifically, in the present embodiment, the liquid crystal molecules are aligned substantially vertical to the substrate surface. In this OFF state, incident light from the backlight 20 passes successively through the circular polarizer 30, and the liquid crystal layer 23 which is in a state in which retardation is substantially zero, and is then absorbed in the circular polarizer 33. Thereby, the liquid crystal display device 10 effects black display.

Figure 9B:
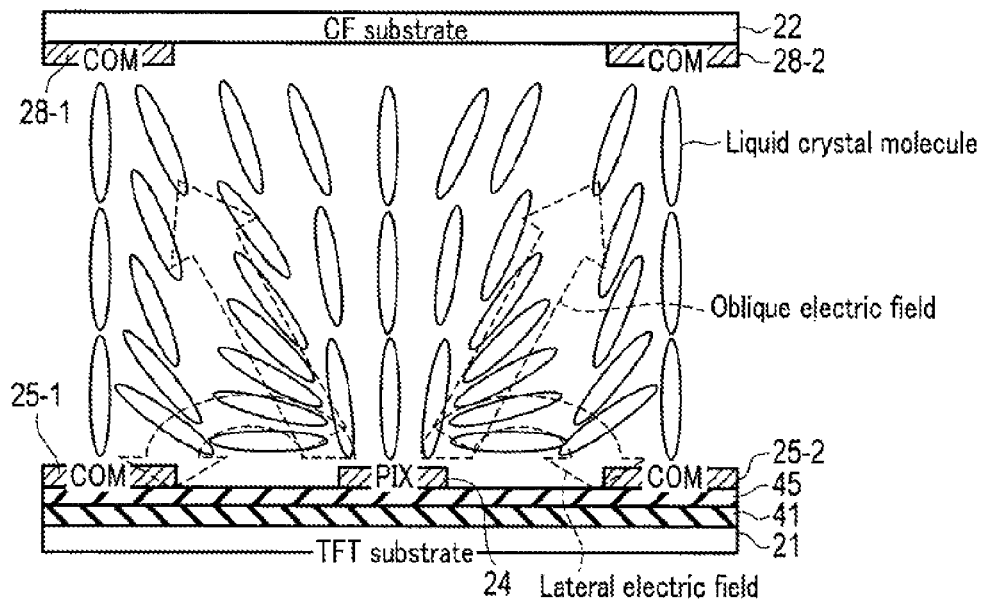
FIG. 9B is a view for explaining an alignment state of the liquid crystal layer.

Next, a description is given of display in a state in which an electric field is applied to the liquid crystal layer 23. FIG. 9B is a view for explaining an alignment state of liquid crystal molecules in the state in which an electric field is applied to the liquid crystal layer 23. The common voltage supply circuit 14 applies a common voltage Vcom (e.g. 0 V) to the common electrodes 25 and 28, and the signal driver 13 applies to the pixel electrode 24 a driving voltage (e.g. 5 V) which is higher than the common voltage Vcom.

In the voltage relation (ON state) of FIG. 9B, a lateral electric field occurring between the pixel electrode 24 and common electrode 25, and an oblique electric field occurring between the pixel electrode 24 and common electrode 28, are applied to the liquid crystal layer 23. Thereby, the liquid crystal layer 23 takes a half-bend alignment (one side half of a bend alignment), and the liquid crystal molecules incline toward the common electrodes 25 and 28, relative to a perpendicular extending through the center of the pixel electrode 24. Specifically, the inclination of liquid crystal molecules becomes greater as the liquid crystal molecules are closer to the pixel electrode 24 and common electrode 25, and the inclination of liquid crystal molecules becomes smaller as the liquid crystal molecules are closer to the common electrode 28 from the pixel electrode 24. In addition, since the common electrode 28 is disposed in an oblique direction from the pixel electrode 24, a greater oblique electric field can be applied to the liquid crystal layer 23. Thereby, since the liquid crystal molecules above the pixel electrode 24 can also be inclined, the transmittance can be enhanced.

In this ON state, incident light from the backlight 20 passes through the circular polarizer 30, and then the light passes through the liquid crystal layer 23 and a predetermined retardation is imparted to the light. Further, transmissive light passing through the liquid crystal layer 23 passes through the circular polarizer 33. Thereby, the liquid crystal display device 10 effects white display (actually, color display corresponding to the color filter).

[5. Advantageous Effects]

As has been described above in detail, in the first embodiment, the liquid crystal layer 23 is composed of the p-type (positive type) liquid crystal material, and the liquid crystal molecules are aligned substantially vertical in the state in which no electric field is applied. In addition, the linear pixel electrode 24 and the common electrode 25, which is formed in a manner to surround or sandwich the pixel electrode 24 with a predetermined spacing, are provided on the TFT substrate 21. Furthermore, the common electrode 28 is provided on the CF substrate 22. The common electrode 28 has substantially the same planar shape as the common electrode 25 and is formed such that at least a part of the common electrode 28 overlaps the common electrode 25.

Thus, according to the first embodiment, when the electric field is applied to the liquid crystal layer 23, the liquid crystal molecules take a bend alignment (to be more specific, a half-bend alignment). Therefore, compared to the VA (Vertical Alignment) mode and IPS (In-Plane Switching)/FFS (Fringe Field Switching) mode, the response speed of the liquid crystal display panel 11 can be made higher.

Figure 10:
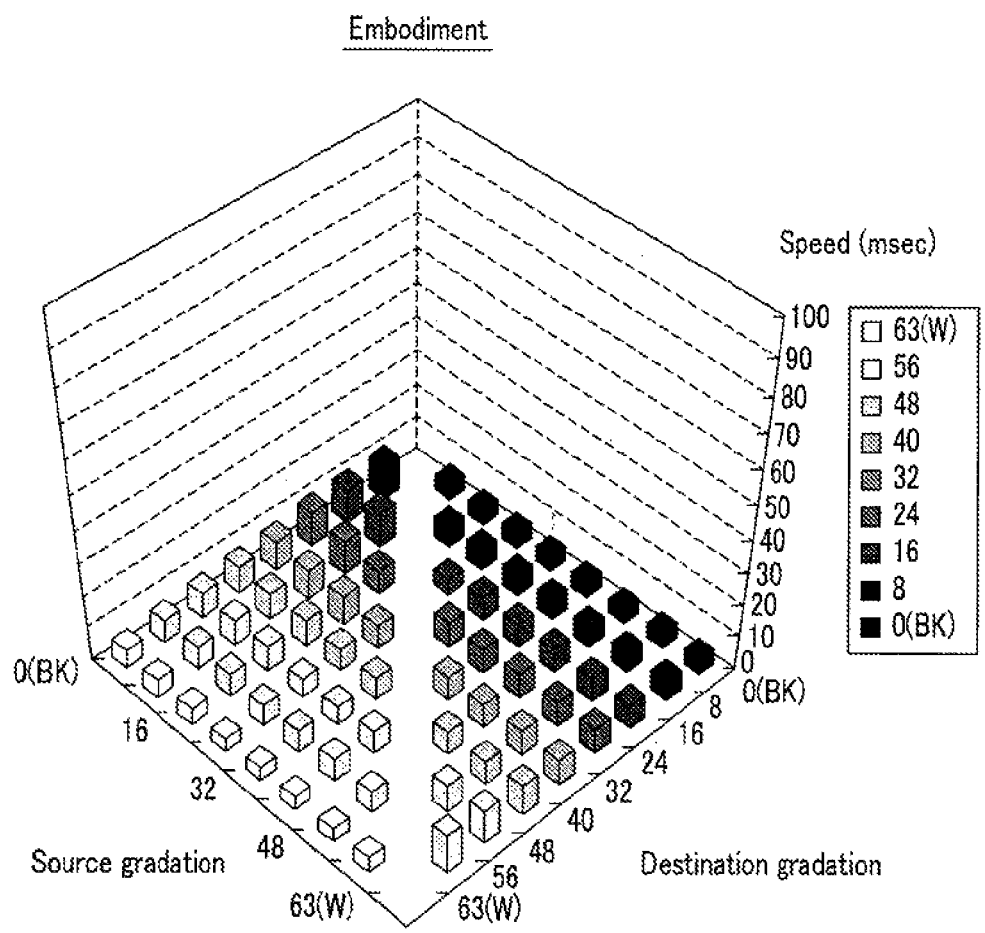
FIG. 10 is a graph for explaining a response speed of the liquid crystal display panel according to the embodiment.

FIG. 10 is a graph for explaining the response speed of the liquid crystal display panel 11 according to the embodiment. In FIG. 10, an X axis indicates a source gradation, a Y axis indicates a destination gradation, and a Z axis indicates a response speed (msec). The source gradation means a gradation before the gradation is changed. The destination gradation means a gradation after the gradation was changed. The numerals on the X axis and Y axis represent gradation levels. Here, the response speed in a case of displaying 64 gradation levels (gradation 0~gradation 63) is indicated. The gradation 0 is black (BK), and gradation 63 is white (W).

As regards how to view the graph of FIG. 10, when display is changed from a first gradation (source gradation) to a second gradation (destination gradation), the response speed can be understood from the height of a bar graph at a position of intersection between a numeral of the first gradation described on the X axis (source gradation) and a numeral of the second gradation described on the Y axis (destination gradation).

Figure 11:
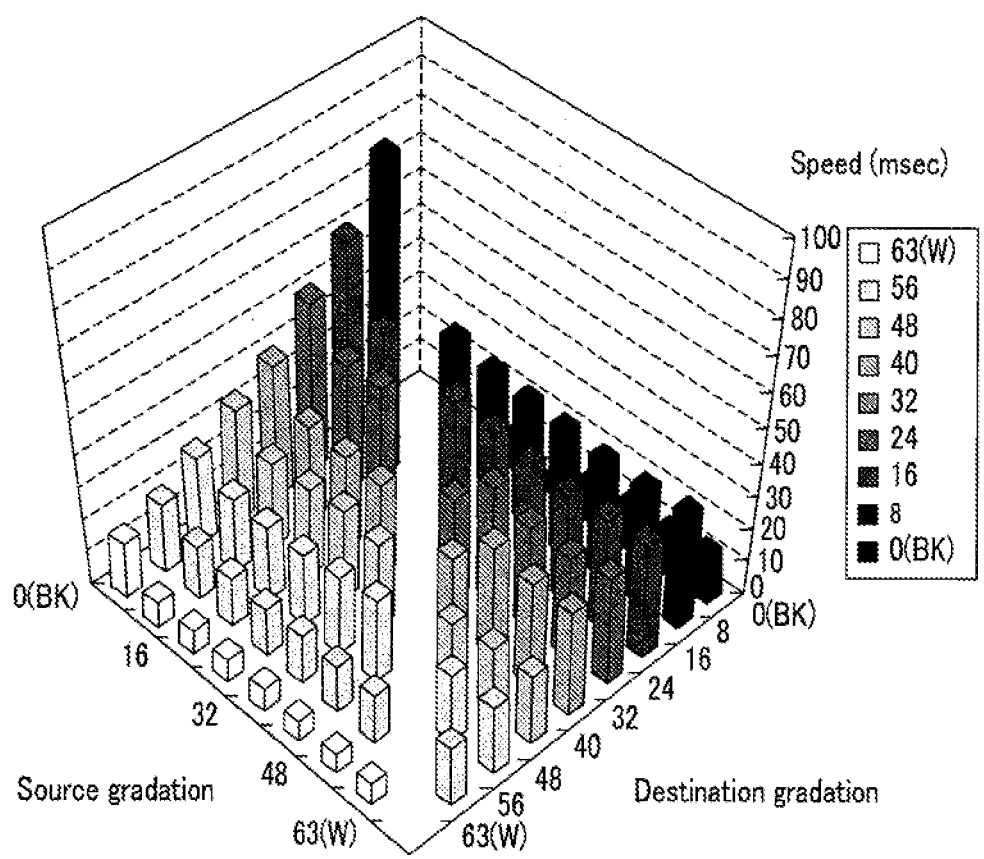
FIG. 11 is a graph for explaining a response speed in a first comparative example.

FIG. 11 is a graph for explaining a response speed in a VA-mode liquid crystal display panel (first comparative example). FIG. 12 is a graph for explaining a response speed in an FFS-mode liquid crystal display panel (second comparative example). It is understood that the response speed of the liquid crystal display panel 11 of the embodiment shown in FIG. 10 is improved, compared to the first comparative example (FIG. 11) and second comparative example (FIG. 12).

Additionally, there is no need to form, on the common electrode 28 on the CF substrate 22 side, a dielectric film for adjusting an electric field which is applied to the liquid crystal layer 23, the dielectric film being required in a conventional TBA (Transverse Bend Alignment). Thereby, it is possible to suppress residual image (so-called image persistence) occurring due to a DC (direct current) imbalance.

Additionally, the common electrode 28 on the CF substrate 22 side is disposed in a manner to overlap the common electrode 25 on the TFT substrate 21 side in planar projection. Thereby, a stronger oblique electric field occurs between the pixel electrode 24 on the TFT substrate 21 side and the common electrode 28 on the CF substrate 22 side. Thereby, since liquid crystal molecules can be inclined so as to take a desired half-bend alignment, the transmittance can be enhanced.

Additionally, in the TBA mode, since the transmittance is low, it is difficult to decrease the cell gap to less than about 4 μm, which is a normal value. However, by adopting the configuration of the present embodiment, it becomes possible to decrease to the cell gap to about 3 μm, and the response speed can be further increased.

Additionally, in the case of the cell gap of about 4 μm, the viewing angle becomes narrow with use of the current circular polarizer (composed of the polarizer and retardation plate (λ/4 plate)) in relation to a retardation And of the liquid crystal layer, and it is thus difficult to use the circular polarizer. However, in the liquid crystal display panel 11 of the present embodiment, since the cell gap can be decreased, the circular polarizer can be used without degradation in viewing angle. Besides, by disposing the circular polarizer in the liquid crystal display panel 11, it is possible to extract light from an area where there are liquid crystal molecules tilted in the axial direction of the polarizer, such light being unable to be extracted by a linear polarizer. It is thus possible to further improve the transmittance. Moreover, since the optical design of the reflective display can be optimized, it is possible to adapt to the transflective liquid crystal display panel.

[Second Embodiment]

Figure 13A:
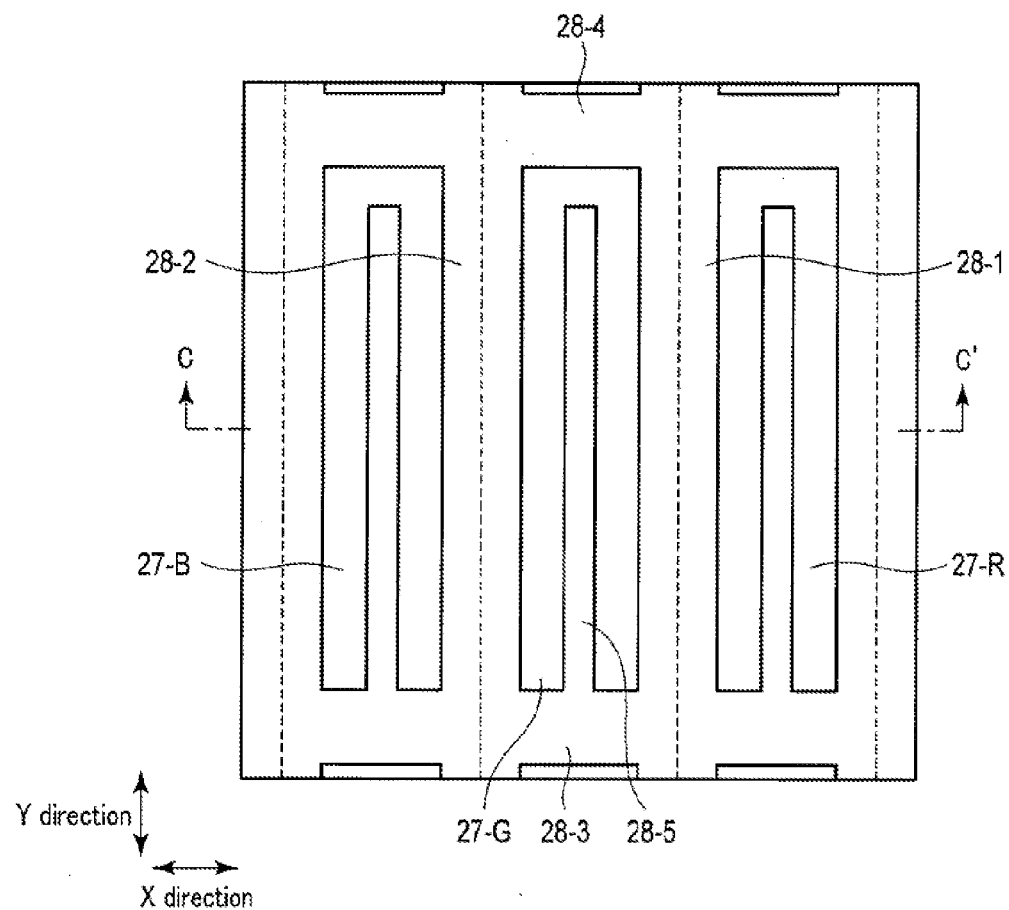
FIG. 13A is a layout view of a CF substrate according to a second embodiment of the present invention.
Figure 13B:
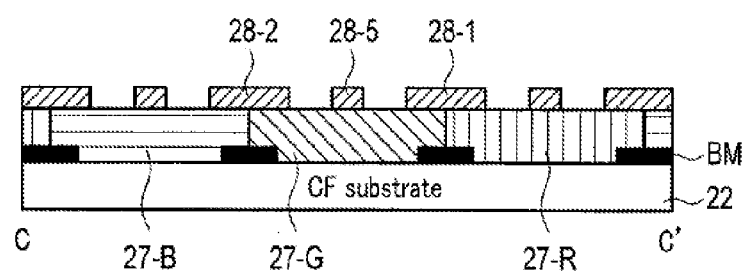
FIG. 13B is a cross-sectional view of the CF substrate, taken along line C-C' shown in FIG. 13A.

FIG. 13A and FIG. 13B are a layout view and a cross-sectional view of a CF substrate 22 according to a second embodiment of the present invention. FIG. 13A is a layout view of the CF substrate 22, and FIG. 13B is a cross-sectional view of the CF substrate 22, taken along line C-C' shown in FIG. 13A. FIG. 13A and FIG. 13B illustrate the layout of three pixels. FIG. 13A and FIG. 13B illustrate, by way of example, a color filter 27 of a stripe array.

A common electrode 28 is provided on the color filter 27. The common electrode 28 includes an electrode portion which is formed in a manner to overlap, in planar projection, the common electrode 25 formed on the TFT substrate 21 side, and an electrode portion which is formed in a manner to overlap, in planar projection, the pixel electrode 24 formed on the TFT substrate 21 side. Specifically, the common electrode 28 is configured to include a basic unit composed of linear common electrodes 28-1 and 28-2 which sandwich the pixel electrode 24 from both sides in the X direction and which each extend in the Y direction, linear common electrodes 28-3 and 28-4 which electrically connect the common electrodes 28-1 and 28-2 and which each extend in the X direction, and a common electrode 28-5 disposed between the common electrodes 28-1 and 28-2 with a predetermined spacing, and such basic units are disposed in a grid shape on four sides so as to correspond to the pixels. The common electrodes 28-1 to 28-4 are disposed in a manner to overlap, in planar projection, the common electrode 25 formed on the TFT substrate 21 side. The common electrode 28-5 is disposed in a manner to overlap, in planar projection, the pixel electrode 24 formed on the TFT substrate 21 side.

Next, the operation of the liquid crystal display device 10 with the above-described configuration is described. FIG. 14A is a view for explaining an alignment state of liquid crystal molecules in the state (OFF state) in which no electric field is applied to the liquid crystal layer 23. The common voltage supply circuit 14 applies a common voltage Vcom (e.g. 0 V) to the common electrodes 25 and 28, and the signal driver 13 applies a common voltage Vcom to the pixel electrode 24. The display of the liquid crystal display device 10 in this OFF state is the same as in the case of FIG. 9A.

FIG. 14B is a view for explaining an alignment state of liquid crystal molecules in the state (ON state) in which an electric field is applied to the liquid crystal layer 23. The common voltage supply circuit 14 applies a common voltage Vcom (e.g. 0 V) to the common electrodes 25 and 28, and the signal driver 13 applies to the pixel electrode 24 a driving voltage (e.g. 5 V) which is higher than the common voltage Vcom.

In this ON state, like the first embodiment, the liquid crystal layer 23 takes a half-bend alignment. Further, since an electric field in a vertical direction (perpendicular direction) is applied between the pixel electrode 24 and common electrode 28-5, the liquid crystal molecules existing between the pixel electrode 24 and common electrode 28-5 take a vertical alignment. Thereby, since the alignment of the entirety of the liquid crystal layer 23 can be stabilized, it is possible to suppress a display defect occurring when the display surface of the liquid crystal display panel 11 is pushed (at a time of surface push). The other advantageous effects are the same as in the first embodiment.

[Third Embodiment]

A third embodiment is a configuration example of the liquid crystal display panel 11 in a case in which the pixel 17 includes a plurality of linear pixel electrodes 24.

FIG. 15 is a layout view of a TFT substrate 21 according to the third embodiment of the present invention. FIG. 16 is a layout view of a CF substrate 22 as viewed from the liquid crystal layer 23 side. FIG. 17 is a cross-sectional view of the liquid crystal display panel 11, taken along line C-C' shown in FIG. 15 and FIG. 16. Incidentally, in the cross-sectional view of FIG. 17, the depiction of the circular polarizers 30 and 33 and alignment films 26 and 29 shown in FIG. 3 is omitted.

In FIG. 15, a pixel electrode 24 provided on the TFT substrate 21 includes a plurality of linear pixel electrodes 24-1 and 24-2 each extending in the Y direction, and a connection portion 24-3 which electrically connects the pixel electrodes 24-1 and 24-2. The connection portion 24-3 is electrically connected to the drain electrode 44 by the contact plug 48.

A common electrode 25 provided on the TFT substrate 21 is configured to include a basic unit composed of linear common electrodes 25-1 and 25-2 which are disposed in a manner to sandwich the pixel electrodes 24-1 and 24-2 from both sides in the X direction and which each extend in the Y direction, linear common electrodes 25-3 and 25-4 which electrically connect the common electrodes 25-1 and 25-2 and which each extend in the X direction, and a common electrode 25-5 disposed between the common electrodes 24-1 and 24-2 with a predetermined spacing, formed in a line shape extending in the Y direction and electrically connected to the common electrode 25-4, and such basic units are disposed in a grid shape on four sides so as to correspond to the pixels. Specifically, the common electrodes 25-1 and 25-5 are disposed in a manner to sandwich the pixel electrode 24-1, which is provided on the TFT substrate 21, from both sides in the X direction with a predetermined spacing, and the common electrodes 25-2 and 25-5 are disposed in a manner to sandwich the pixel electrode 24-2, which is provided on the TFT substrate 21, from both sides. In addition, the common electrodes 25-1 and 25-2 are disposed in a manner to cover the signal lines SL in planar projection.

In FIG. 16, a common electrode 28 is provided on the color filter 27. The common electrode 28 has substantially the same planar shape as the common electrode 25 formed on the TFT substrate 21 side, and is disposed in a manner to overlap the common electrode 25 in planar projection. Specifically, the common electrode 28 is composed of common electrodes 28-1 to 28-5, and the common electrodes 28-1 to 28-5 are disposed in a manner to overlap the common electrodes 25-1 to 25-5 in planar projection.

Incidentally, FIG. 15 illustrates the configuration example of the transflective liquid crystal display panel 11 including the reflective area and transmissive area. However, like the first embodiment, the present embodiment is applicable to a transmissive liquid crystal display panel 11 which does not include the reflective area. The transmissive liquid crystal display panel 11 is constructed by removing the reflection film 46 shown in FIG. 15 and FIG. 17.

According to the third embodiment, the liquid crystal layer can be set in a half-bend alignment between the common electrode 25-1 and pixel electrode 24-1, between the pixel electrode 24-1 and common electrode 25-5, between the common electrode 25-5 and pixel electrode 24-2, and between the pixel electrode 24-2 and common electrode 25-2. In this manner, also in the case in which the pixel 17 includes the plural linear pixel electrodes 24, the same operation as in the first embodiment can be realized. Needless to say, three or more linear pixel electrodes may be disposed in the pixel 17. Besides, the second embodiment can be applied to the third embodiment.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A liquid crystal display device comprising:
    first and second substrates disposed to be opposed to each other;
    a liquid crystal layer held between the first and second substrates, formed of a p-type liquid crystal material, and configured to take a vertical alignment in a state in which no electric field is applied;
    a pixel electrode provided on the first substrate and extending in a first direction;
    a first common electrode provided on the first substrate, and formed in a manner to surround or sandwich the pixel electrode with a predetermined spacing;
    a second common electrode provided on the second substrate, having substantially the same planar shape as the first common electrode, and overlapping the first common electrode in planar projection; and
    a third common electrode provided on the second substrate, electrically connected to the second common electrode, and extending the first direction to overlap the pixel electrode in planar projection.

2. The liquid crystal display device of claim 1, further comprising a driving circuit configured to apply the same voltage to the first common electrode and the second common electrode.

3. The liquid crystal display device of claim 1, further comprising a signal line for supplying a driving voltage to the pixel electrode,
    wherein the first common electrode is disposed to cover the signal line.

4. The liquid crystal display device of claim 1, further comprising first and second circular polarizers disposed to sandwich the first and second substrates.

5. The liquid crystal display device of claim 1, further comprising a reflection film provided on the first substrate and reflecting incident light.

* * * * *